United States Patent [19]

Piltingsrud

[11] 4,107,534
[45] Aug. 15, 1978

[54] PLUTONIUM-AMERICIUM DETECTION PROBE WITH FRONTAL LIGHT-GUIDE-DIFFUSER

[76] Inventor: Harley V. Piltingsrud, 3431 Whitfield Ave., Cincinnati, Ohio 45220

[21] Appl. No.: 805,664

[22] Filed: Jun. 13, 1977

[51] Int. Cl.² ............................................. G01T 1/20
[52] U.S. Cl. .................................. 250/368; 250/485; 250/487
[58] Field of Search ................... 250/361 R, 362, 363, 250/368, 483, 487, 485

[56] References Cited

U.S. PATENT DOCUMENTS 3,917,950  11/1975  Carlson ............................. 250/483

Primary Examiner—Davis L. Willis
Attorney, Agent, or Firm—Joseph E. Rusz; Richard J. Killoren

[57] ABSTRACT

A detector probe for a scintillation detection instrument having a photomultiplier within a housing with an europium activated scintillation crystal positioned adjacent the face plate of the photomultiplier. A thin sheet of foil is spaced from the front of the scintillation crystal. The outer surface of the photomultiplier, except for the face plate, and the peripheral surface of the scintillation crystal are coated with a layer of highly reflective paint. The surface of the scintillation crystal facing the aluminum sheet is course ground and the inner surface of an annular spacer between the scintillation crystal and the surface of the aluminum sheet facing the scintillation crystal are coated with a highly reflective paint to provide an air filled light guide diffuser in front of the scintillation crystal. A layer of styrofoam is provided adjacent the aluminum sheet to protect against thermal and mechanical shock. The forward end of the housing is sealed with a protective layer to prevent radioactive contamination.

5 Claims, 2 Drawing Figures

U.S. Patent  Aug. 15, 1978  4,107,534
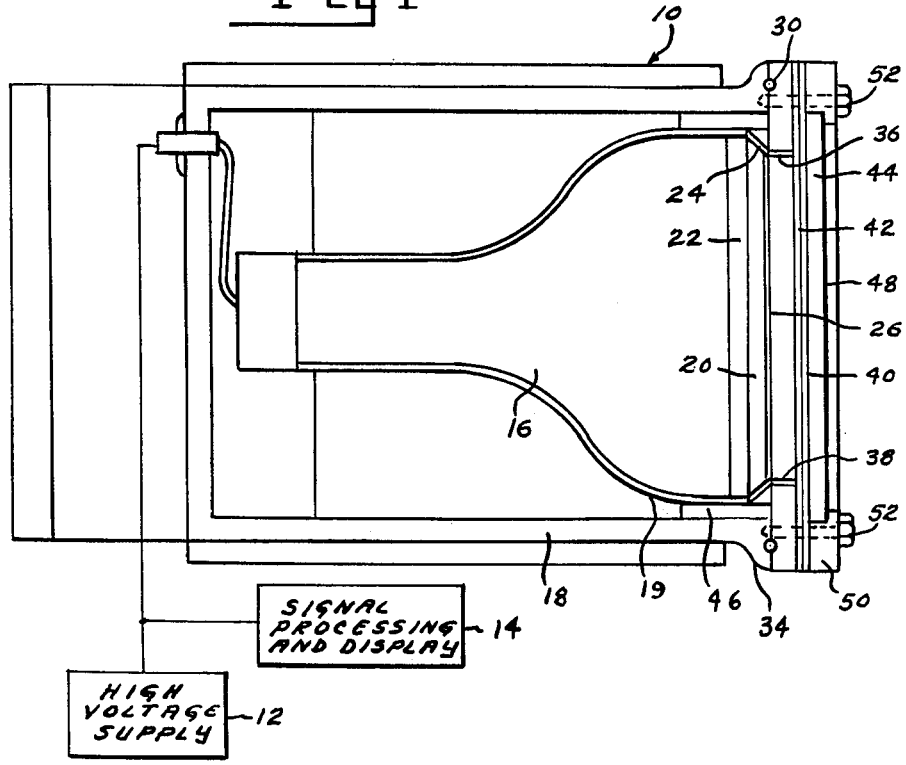
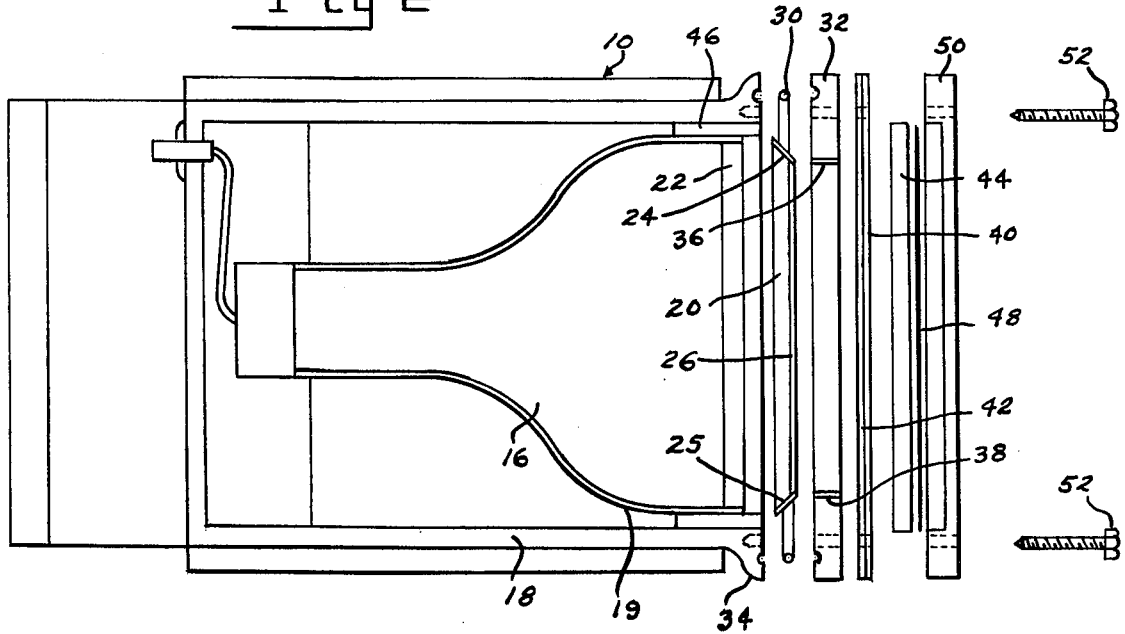

4,107,534

PLUTONIUM-AMERICIUM DETECTION PROBE WITH FRONTAL LIGHT-GUIDE-DIFFUSER

RIGHTS OF THE GOVERNMENT

The invention described herein may be manufactured and used by or for the Government of the United States for all governmental purposes without the payment of any royalty.

BACKGROUND OF THE INVENTION

This invention relates to a scintillation detector probe for use in making field measurements of various plutonium and americium isotopes and other low energy X and gamma ray sources.

The U.S. patents to Platt, No. 3,052,796, and Omohundro, No. 3,087,060, show two prior art scintillation counters.

Scintillation detection instruments used for field detection of plutonium and americium consist of a detector probe having a scintillation crystal and a photomultiplier together with a ratemeter assembly with batteries and high voltage power supply. Applicant's U.S. Pat. No. 3,950,647, describes a light weight field repairable probe.

BRIEF SUMMARY OF THE INVENTION

According to this invention, a detector probe for a scintillation detector instrument is modified to provide a light guide diffuser in front of the scintillation crystal, which increases the light collection efficiency and energy resolution through a more even illumination of the photomultiplier tube photocathode. The light collection efficiency and energy resolution is further increased by coating the whole surface of the photomultiplier, except the face plate, with a layer of a highly reflective material and by having the front face of the scintillation crystal course ground.

IN THE DRAWING

FIG. 1 is a schematic illustration of a plutonium-americium detection instrument according to the invention.

FIG. 2 is a partially exploded view of the detection probe of the device of FIG. 1.

DETAILED DESCRIPTION OF THE INVENTION

Reference is now made to FIG. 1 of the drawing which shows a detection probe 10 connected to a high voltage supply 12 and a signal processing circuit 14.

The probe 10 has an end window type photomultiplier 16 mounted within a housing 18. The housing is made of a non-radioactive strong light weight, light opaque material, for example, a metal such as aluminum. A layer 19 of paint with high reflectivity, such as titanium dioxide in a lacquer base, is coated on the outer surface of the photomultiplier envelope in all areas except the face plate.

An europium activated calcium fluoride scintillation crystal 20 is positioned adjacent the face plate 22 of the photomultiplier tube 16. The crystal may be coupled to the photomultiplier face plate 22 with an optical coupling silicone grease or other coupling means. The edge of the crystal has a bevel of approximately 30° from the normal to the crystal face to facilitate light collection from the crystal edge onto the face of the photomultiplier tube photocathode. The peripheral surface 24 of the crystal 20 is coated with a layer 25 of a highly reflective material, which may be the same as layer 19, on photomultiplier tube 16. The surface of the crystal 20 is ground with No. 400 carburndum paper to provide a translucent light diffusing layer schematically indicated at 26.

An O-ring seal 30 is provided between an annular ring 32 and a flange mount 34 on the housing 18. The thickness of the annular ring 32 is between ¼ and ⅜ inches. The inner surface 36 of ring 32 is coated with a layer 38 of a highly reflective material such as used for layers 19 and 25.

A light impervious, reflective electrostatic shield such as a thin sheet 40 of aluminum foil, with a thickness of approximately 0.001 inch, is positioned adjacent the ring 32. The aluminum foil is coated with a layer 42 of highly reflective material, as described above, on the side adjacent the scintillation crystal 20. The space within ring 32 and coatings 38 and 42 provide substantially the same function as an air filled light guide but without the severe interface transmission losses normally experienced with a conventional air light guide placed between the crystal and the photomultiplier tube.

A styrofoam disk 44 may be provided over the aluminum layer to protect the assembly from thermal and mechanical shock. Mechanical shock protection is also provided by a layer 46 of neoprene. A Mylar sheet 48 provides a seal to prevent contamination of the interior of the housing from water, dirt or radioactive materials. A light opaque polycarbonate plastic can be substituted for the Mylar in which case the styrofoam disk may not be needed. The assembly is held in place by means of a flange mount 50 which is secured to the flange mount 34 by means of screws 52.

In the operation of the device of the invention, plutonium-americium electromagnetic emissions are detected in substantially the same manner as in prior art devices. The device of the invention provides an overall improvement of light collection efficiency and energy resolution with an inclusion of more of the 17 KeV peak above the photomultiplier tube noise. This allows for an increased detectability of plutonium-americium.

There is thus provided an improved detection instrument for plutonium-americium which provides increased energy resolution and consequently increases the detectability of plutonium-americium.

I claim:

1. A detector probe for a scintillation detector instrument, comprising: metal housing; an end window type photomultiplier tube within said housing; an europium activated calcium fluoride scintillation crystal; means for coupling said crystal to the end window of the photomultiplier tube; a light impervous, reflective electrostatic shield on the side of said crystal remote from said photomultiplier tube; means for providing a light guide diffuser between the electrostatic shield and the photomultiplier on the side of the scintillation crystal remote from said photomultiplier and a radioactive contamination barrier on the side of said electrostatic shield, remote from said scintillation crystal.

2. The device as recited in claim 1 including a highly reflective coating on all the outer surface of the photomultiplier envelope, except the face plate.

3. The device as recited in claim 1 wherein said light impervious, reflective electrostatic shield is a thin sheet of aluminum.

4. The device as recited in claim 3 wherein said light guide diffuser includes a course ground surface on the scintillation crystal on the side adjacent the reflective electrostatic shield; a highly reflective coating on the peripheral surface of the scintillation crystal; an annular spacer between the scintillation crystal and said sheet of aluminum; a highly reflective coating on the inner surface of the annular spacer; and a coating of highly reflective material on the sheet of aluminum on the side adjacent the scintillation crystal.

5. The device as recited in claim 4 including a highly reflective coating on the outer surface of the photomultiplier tube, except for the face plate; and a shock absorbent layer between said sheet of aluminum and said contamination barrier.

* * * * *